US011310328B2

(12) United States Patent
Eberlein

(10) Patent No.: US 11,310,328 B2
(45) Date of Patent: Apr. 19, 2022

(54) GENERIC COMMAND LINE INTERFACE TO AN EXTENSIBLE LIST OF CLOUD PLATFORM SERVICES

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 202 days.

(21) Appl. No.: 16/402,453

(22) Filed: May 3, 2019

(65) Prior Publication Data

US 2020/0351367 A1 Nov. 5, 2020

(51) Int. Cl.
*H04L 29/08* (2006.01)
*G06F 9/54* (2006.01)
*G06F 9/451* (2018.01)
*G06F 40/211* (2020.01)
*H04L 67/567* (2022.01)

(52) U.S. Cl.
CPC .......... *H04L 67/2838* (2013.01); *G06F 9/451* (2018.02); *G06F 9/547* (2013.01); *G06F 40/211* (2020.01)

(58) Field of Classification Search
CPC ............... H04L 67/2838; H04L 67/327; H04L 67/2823; G06F 40/211; G06F 9/547; G06F 9/451; G06F 2209/541; G06F 9/54; G06F 9/45512
See application file for complete search history.

(56) References Cited

U.S. PATENT DOCUMENTS

| 7,720,992 | B2 | 5/2010 | Brendle et al. |
| 8,126,919 | B2 | 2/2012 | Eberlein |
| 8,225,303 | B2 | 7/2012 | Wagner et al. |
| 8,301,610 | B2 | 10/2012 | Driesen et al. |
| 8,375,130 | B2 | 2/2013 | Eberlein et al. |
| 8,402,086 | B2 | 3/2013 | Driesen et al. |
| 8,407,297 | B2 | 3/2013 | Schmidt-Karaca et al. |
| 8,434,060 | B2 | 4/2013 | Driesen et al. |
| 8,467,817 | B2 | 6/2013 | Said et al. |
| 8,560,876 | B2 | 10/2013 | Driesen et al. |
| 8,572,369 | B2 | 10/2013 | Schmidt-Karaca et al. |
| 8,604,973 | B2 | 12/2013 | Schmidt-Karaca et al. |

(Continued)

OTHER PUBLICATIONS

U.S. Appl. No. 15/847,627, Boer et al., filed Dec. 19, 2017.

(Continued)

*Primary Examiner* — Javier O Guzman
(74) *Attorney, Agent, or Firm* — Fish & Richardson P.C.

(57) ABSTRACT

Methods and systems are used for providing a generic command line interface to an extensible list of cloud platform services. As an example, a generic command request including a command and command input data is received from a client. A platform service for the command is determined based on command metadata associated with the command. The command input data is mapped to a platform service application programming interface (API) associated with the platform service based on the command metadata associated with the command. The platform service API is called based on the mapping. Response data from the platform service API is mapped to command output data in a generic command response based on the command metadata associated with the command. The generic command response is transmitted to the client.

20 Claims, 3 Drawing Sheets

(56) References Cited

U.S. PATENT DOCUMENTS

| | | | |
|---|---|---|---|
| 8,612,406 B1 | 12/2013 | Said et al. | |
| 8,631,406 B2 | 1/2014 | Driesen et al. | |
| 8,645,483 B2 | 2/2014 | Odenheimer et al. | |
| 8,706,772 B2 | 4/2014 | Hartig et al. | |
| 8,732,083 B2 | 5/2014 | Vasing et al. | |
| 8,751,573 B2 | 6/2014 | Said et al. | |
| 8,805,986 B2 | 8/2014 | Driesen et al. | |
| 8,875,122 B2 | 10/2014 | Driesen et al. | |
| 8,880,486 B2 | 11/2014 | Driesen et al. | |
| 8,924,384 B2 | 12/2014 | Driesen et al. | |
| 8,972,934 B2 | 3/2015 | Driesen et al. | |
| 9,003,356 B2 | 4/2015 | Driesen et al. | |
| 9,009,105 B2 | 4/2015 | Hartig et al. | |
| 9,032,406 B2 | 5/2015 | Eberlein | |
| 9,069,984 B2 | 6/2015 | Said et al. | |
| 9,077,717 B2 | 7/2015 | Said et al. | |
| 9,122,669 B2 | 9/2015 | Demant et al. | |
| 9,137,130 B2 | 9/2015 | Driesen et al. | |
| 9,182,979 B2 | 11/2015 | Odenheimer et al. | |
| 9,183,540 B2 | 11/2015 | Eberlein et al. | |
| 9,223,985 B2 | 12/2015 | Eberlein et al. | |
| 9,256,840 B2 | 2/2016 | Said et al. | |
| 9,262,763 B2 | 2/2016 | Peter et al. | |
| 9,268,727 B1* | 2/2016 | Jain | H04L 67/1097 |
| 9,274,757 B2 | 3/2016 | Said et al. | |
| 9,336,227 B2 | 5/2016 | Eberlein et al. | |
| 9,354,860 B2 | 5/2016 | Eberlein et al. | |
| 9,354,871 B2 | 5/2016 | Eberlein et al. | |
| 9,367,199 B2 | 6/2016 | Klemenz et al. | |
| 9,632,802 B2 | 4/2017 | Said et al. | |
| 9,633,107 B2 | 4/2017 | Said et al. | |
| 9,652,744 B2 | 5/2017 | Eberlein et al. | |
| 9,703,554 B2 | 7/2017 | Eberlein et al. | |
| 9,720,994 B2 | 8/2017 | Driesen et al. | |
| 9,721,116 B2 | 8/2017 | Driesen et al. | |
| 9,800,689 B2 | 10/2017 | Said et al. | |
| 9,836,299 B2 | 12/2017 | Eberlein et al. | |
| 9,854,045 B2 | 12/2017 | Said et al. | |
| 9,858,309 B2 | 1/2018 | Eberlein et al. | |
| 9,898,279 B2 | 2/2018 | Eberlein et al. | |
| 9,898,494 B2 | 2/2018 | Eberlein et al. | |
| 9,898,495 B2 | 2/2018 | Eberlein et al. | |
| 10,061,788 B2 | 8/2018 | Said et al. | |
| 10,185,552 B2 | 1/2019 | Eberlein et al. | |
| 10,230,708 B2 | 3/2019 | Eberlein | |
| 10,268,472 B2 | 4/2019 | Eberlein et al. | |
| 10,298,591 B2 | 5/2019 | Eberlein et al. | |
| 10,540,452 B1* | 1/2020 | Andrews | G06F 16/173 |
| 10,678,522 B1* | 6/2020 | Yerramreddy | G06F 8/65 |
| 10,810,055 B1* | 10/2020 | Walker | G06F 9/5005 |
| 10,958,711 B1* | 3/2021 | Lindner | H04L 67/1076 |
| 2006/0171405 A1 | 8/2006 | Brendle et al. | |
| 2007/0169008 A1* | 7/2007 | Varanasi | H04L 41/08 717/136 |
| 2007/0185720 A1 | 8/2007 | Eberlein et al. | |
| 2008/0222248 A1 | 9/2008 | Eberlein et al. | |
| 2008/0275973 A1* | 11/2008 | Toeroe | G06F 11/1482 709/223 |
| 2009/0083647 A1* | 3/2009 | Khan | H04L 41/0803 715/771 |
| 2009/0106371 A1 | 4/2009 | Schmidt-Karaca et al. | |
| 2009/0106372 A1 | 4/2009 | Schmidt-Karaca et al. | |
| 2009/0150479 A1 | 6/2009 | Eberlein et al. | |
| 2009/0172110 A1 | 7/2009 | Eberlein et al. | |
| 2010/0161648 A1 | 6/2010 | Eberlein et al. | |
| 2011/0154445 A1 | 6/2011 | Schmidt-Karaca et al. | |
| 2012/0136839 A1 | 5/2012 | Eberlein et al. | |
| 2013/0085810 A1 | 4/2013 | Driesen et al. | |
| 2013/0166415 A1 | 6/2013 | Odenheimer et al. | |
| 2013/0166416 A1 | 6/2013 | Eberlein | |
| 2013/0227137 A1* | 8/2013 | Damola | G06F 9/5072 709/224 |
| 2013/0324201 A1 | 12/2013 | Eberlein et al. | |
| 2013/0325672 A1 | 12/2013 | Odenheimer et al. | |
| 2013/0339488 A1 | 12/2013 | Eberlein et al. | |
| 2014/0025441 A1 | 1/2014 | Eberlein et al. | |
| 2014/0047319 A1 | 2/2014 | Eberlein | |
| 2014/0117076 A1 | 5/2014 | Eberlein | |
| 2014/0149158 A1 | 5/2014 | Odenheimer et al. | |
| 2014/0278808 A1* | 9/2014 | Iyoob | G06Q 30/0206 705/7.35 |
| 2014/0280848 A1* | 9/2014 | Modh | H04L 67/10 709/223 |
| 2014/0325069 A1 | 10/2014 | Odenheimer et al. | |
| 2015/0006608 A1 | 1/2015 | Eberlein et al. | |
| 2015/0089274 A1* | 3/2015 | Mares | H04L 51/04 714/4.11 |
| 2015/0128103 A1* | 5/2015 | Stratton | G06F 8/36 717/100 |
| 2015/0188890 A1 | 7/2015 | Said et al. | |
| 2015/0220576 A1 | 8/2015 | Eberlein | |
| 2015/0220591 A1 | 8/2015 | Eberlein et al. | |
| 2015/0222665 A1 | 8/2015 | Eberlein et al. | |
| 2015/0304231 A1* | 10/2015 | Gupte | H04L 47/70 709/226 |
| 2016/0026698 A1 | 1/2016 | Eberlein et al. | |
| 2016/0127325 A1 | 5/2016 | Odenheimer et al. | |
| 2016/0301739 A1* | 10/2016 | Thompson | G06F 9/547 |
| 2016/0306875 A1* | 10/2016 | Acuna | G06F 16/3349 |
| 2017/0270091 A1* | 9/2017 | Singh | G06F 9/453 |
| 2017/0286467 A1 | 10/2017 | Eberlein et al. | |
| 2018/0081668 A1 | 3/2018 | Eberlein | |
| 2018/0144117 A1 | 5/2018 | Engler et al. | |
| 2018/0146056 A1 | 5/2018 | Eberlein | |
| 2018/0227388 A1* | 8/2018 | Kuo | H04L 67/327 |
| 2018/0316685 A1 | 11/2018 | Eberlein et al. | |
| 2018/0316772 A1 | 11/2018 | Eberlein et al. | |
| 2018/0324251 A1* | 11/2018 | Padmanabh | H04L 67/306 |
| 2018/0329930 A1 | 11/2018 | Eberlein et al. | |
| 2019/0050213 A1* | 2/2019 | Schanafelt | G06F 8/31 |
| 2019/0095230 A1* | 3/2019 | Glessner | G06F 21/57 |
| 2019/0102218 A1* | 4/2019 | Denise | G06F 9/451 |
| 2020/0218579 A1* | 7/2020 | D M | H04L 41/5054 |

OTHER PUBLICATIONS

U.S. Appl. No. 15/874,317, Eberlein et al., filed Jan. 18, 2018.
U.S. Appl. No. 15/883,680, Eberlein, filed Jan. 30, 2018.
U.S. Appl. No. 15/970,499, Eberlein et al., filed May 3, 2018.
U.S. Appl. No. 15/983,812, Eberlein et al., filed May 18, 2018.
U.S. Appl. No. 16/173,225, Eberlein et al., filed Oct. 29, 2018.
U.S. Appl. No. 16/200,427, Mueller et al., filed Nov. 26, 2018.
U.S. Appl. No. 16/208,920, Eberlein et al., filed Dec. 4, 2018.
U.S. Appl. No. 16/214,724, Eberlein et al., filed Dec. 10, 2018.
U.S. Appl. No. 16/219,358, Eberlein et al., filed Dec. 13, 2018.
U.S. Appl. No. 16/219,371, Eberlein et al., filed Dec. 13, 2018.
U.S. Appl. No. 16/219,375, Eberlein, filed Dec. 13, 2018.
U.S. Appl. No. 16/297,057, Eberlein, filed Mar. 8, 2019.

* cited by examiner

GENERIC COMMAND LINE INTERFACE TO AN EXTENSIBLE LIST OF CLOUD PLATFORM SERVICES

BACKGROUND

While graphical user interfaces (GUI) are used extensively in a software consumption model for cloud-computing environments, command line interfaces (CLIs) are still essential tools for administrative and development applications. However, unlike GUIs, CLIs for server applications are not standardized in the same way as web browsers. Instead, each server application may require its own CLI implemented as proprietary client applications for many client computing device operating systems. In order to utilize a server application, a user may need to locate and install a corresponding CLI on their computer. When new functionality is added to the server application, an application provider may also need to enhance the corresponding CLI, which may require the user to re-install the updated version of the CLI. When more than one application provider contributes complementary functionality (for example, as extensions) to a particular server application, then the corresponding CLI for each extension may also need to be extended. This is typically accomplished by using plug-ins to the client application that can be developed and released independently by each application provider, which may further increase the complexity for a user that has to locate, install and maintain the plug-ins on their computer.

SUMMARY

The present disclosure describes a generic command line interface to an extensible list of cloud platform services. In an implementation, a computer-implemented method is used for providing a generic command line interface to an extensible list of cloud platform services. A generic command request including a command and command input data is received, by a command line interface (CLI) backend, from a client. A platform service for the command is determined, by the CLI backend, based on command metadata associated with the command. The command input data is mapped, by the CLI backend, to a platform service application programming interface (API) associated with the platform service based on the command metadata associated with the command. The platform service API is called, by the CLI backend, based on the mapping. Response data from the platform service API is mapped, by the CLI backend, to command output data in a generic command response based on the command metadata associated with the command. The generic command response is transmitted, by the CLI backend, to the client.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, to extend the generic CLI, new functionality only needs to be added on the server-side, which minimizes or eliminates the need for an end user to handle frequent updates to an evolving CLI or to locate and install additional plug-ins. Second, the development effort to support a new API may be minimized because service providers only need to provide some metadata to a CLI backend application to take advantage of its generic CLI, which eliminates the need to implement propriety clients for multiple operating system to support the new API.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
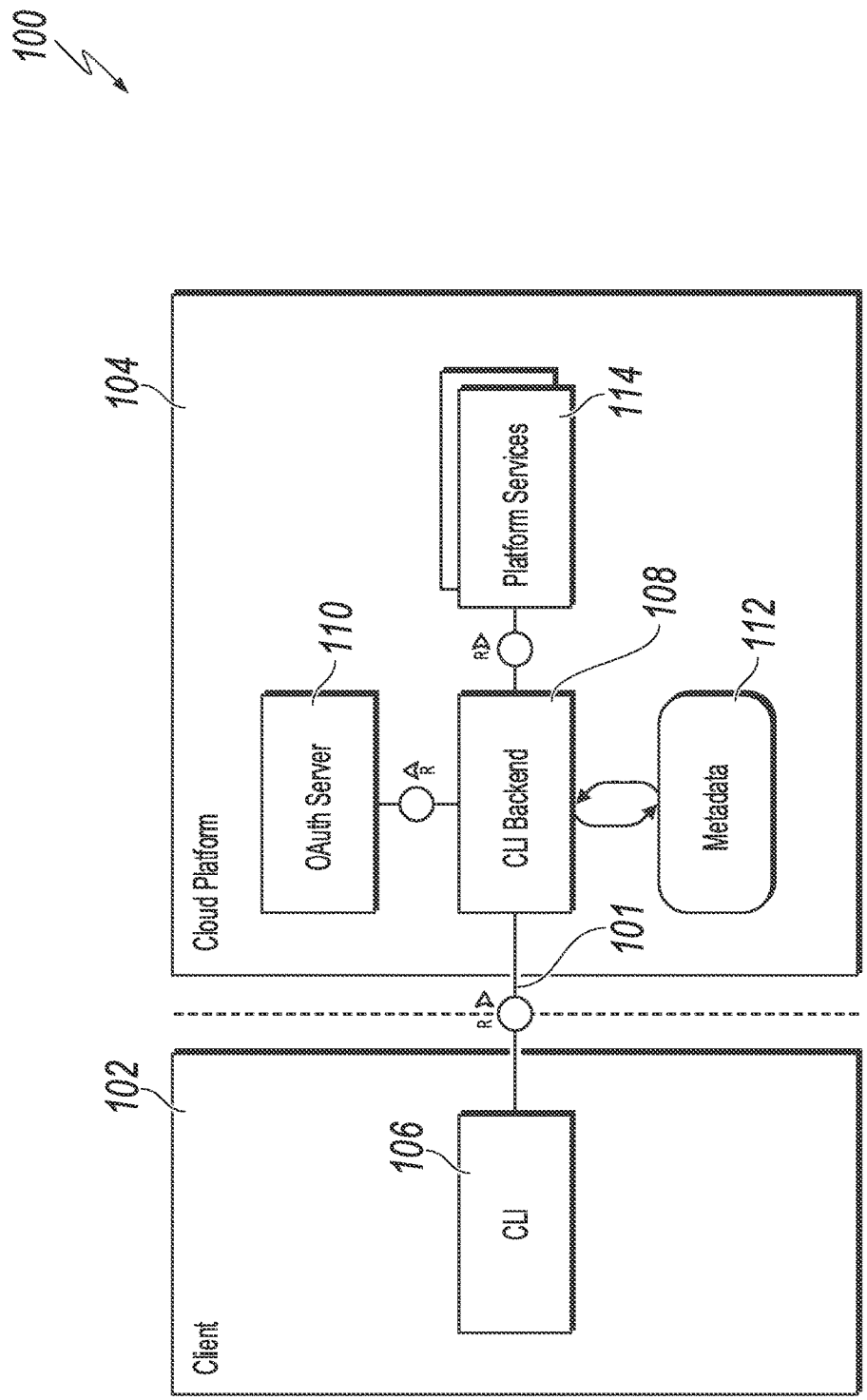
FIG. 1 is a block diagram illustrating an example distributed computing system (EDCS) for providing a generic command line interface to an extensible list of cloud platform services, according to an implementation of the present disclosure.

The following detailed description describes a generic command line interface to an extensible list of cloud platform services, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

For the purposes of this disclosure, a typical command line interface (CLI) system includes both a CLI implemented as a client application installed on a client computing device and a corresponding server application deployed on a server system. A user may need to locate and install a corresponding CLI on their computer. The user utilizes platform services provided by the server application by issuing commands to the CLI in the form of a command line strings (CLS) (also referred herein as user input). A CLS may include a command and one or more parameters associated with the command. The CLI may provide a CLS entered by the user to an authenticated remote system representational state transfer (REST) call to a corresponding server application, which may perform the platform service corresponding to the command in the command line string and provide a service response from the platform service. The CLI may then output the service response provided by the server application to the user on a console of the client computing device.

While graphical user interfaces (GUI) are used extensively in a software consumption model for cloud-computing environments, CLIs are still essential tools for administrative and development applications. However, unlike GUIs, CLIs for server applications are not standardized in the same way as web browsers (for example, by using Hypertext Markup Language (HTML)). Instead, each server application may require its own CLI implemented as proprietary client applications for many client computing device operating systems. In order to utilize a server application, a user may need to locate and install the corresponding CLI on their computer. When new functionality is added to the server application, an application provider may also need to enhance the corresponding CLI, which may require the user to re-install the updated version of the CLI. When more than one application provider contributes complementary functionality (for example, as extensions) to a particular server application, then the corresponding CLI for each extension may also need to be extended. This is typically accomplished by using plug-ins that can be developed and released independently by each application provider, which may further increase the complexity for a user that has to locate, install and maintain the plug-ins on their computer.

In contrast to a typical CLI system, a generic CLI system is disclosed herein. In some implementations, an example generic CLI system may include a generic CLI that may be installed on one or more client computing devices (also referred herein as a client) and a corresponding CLI backend installed on a server system of a cloud platform. The generic CLI may operate with the corresponding CLI backend to provide access to an extensible list of platform services, without the need for client-side plug-ins. This may result in development cost reductions when new platform services are developed and deployed in the cloud platform. This may also result in the reduction of system maintenance costs by reducing or eliminating the need to install the generic CLI on one or more clients whenever the platform services are updated and extended with new services.

The generic CLI may provide a minimal set of functionality to support server-side platform service extensibility. The majority of the functionality to provide an extensible list of platform services may be provided by the CLI backend. By having the majority of the functionality in the CLI backend, the need for any changes to the generic CLI and/or the client may be minimized or eliminated while still supporting server-side platform service extensibility.

The generic CLI utilizes metadata to support extensibility by additional platform services without the need for more software code development. The generic CLI may also allow for server-side plug-ins when special logic is needed. In particular, the minimal set of functionality provided by the generic CLI may include: 1) configuration of the generic CLI including an endpoint of the CLI backend and an account context; 2) user authentication at the CLI backend; 3) management of open authorization (OAuth) refresh and access tokens; 4) providing help about commands and their syntax 5) syntax validation of user input; 6) metadata driven evaluation of user input including differentiating literals from local file references; 7) access to local files and environment variables in the client; exchange of user parameters and data with the CLI backend; and 8) output of platform service response to the user.

The CLI backend provides the majority of the functionality including making the transition from a command line string entered by a user to an authenticated REST call to a platform service and back from a service response provided by the platform service to output provide on the console of the client. In particular, the majority of the functionality provided by the CLI backend may include: 1) metadata to drive the generic CLI; 2) user authentication and authorization, which may be delegated to an OAuth server in the cloud platform; 3) exchange of OAuth tokens for authenticating at the platform services; 4) mapping of user input to platform service application programming interfaces (APIs); 5) mapping response data from the platform service APIs to user output; and 6) help about commands and their syntax.

FIG. 1 is a block diagram illustrating an example distributed computing system (EDCS) 100 for providing a generic command line interface to an extensible list of platform services, according to an implementation of the present disclosure. At a high level, the illustrated EDCS 100 includes or is made up of one or more communicably coupled computers (for example, see FIG. 3) that communicate across a network 101 operating within a cloud-computing-based environment. The illustrated EDCS 100 includes a client 102 and a cloud platform 104. The client 102 includes a generic CLI 106. The cloud platform 104 includes a CLI backend 108, an OAuth server 110, metadata 112, and platform services 114. Although the detailed description is focused on command line interface functionality, other functionality is envisioned to be covered by the described subject matter. Discussion of command line interface functionality is not intended to limit the detailed description to only command line interface functionality and/or to limit the detailed description in any way.

The client 102 may be any computing device operable to connect to and/or communicate with at least the cloud platform 104, the CLI backend 108, and/or the OAuth server 110 (or components interfacing with any of these—whether or not illustrated). In general, the client 102 comprises an electronic computing device operable to receive, transmit, process, and store any appropriate data associated with the EDCS 100. There may be any number of clients 102 associated with, or external to, the EDCS 100.

CLI Features

The generic CLI 106 is a client-side generic command line interface that may be installed on one or more clients 102. The generic CLI 106 operates with the corresponding CLI backend 108 to provide access to an extensible list of platform services 114, without the need for client-side plug-ins. The generic CLI 106 may be command agnostic and may provide a minimal set of functionality needed to support authentication and communication with the CLI backend 108. The generic CLI 106 has little-to-no semantic understanding of the underlying meaning of the content of data it sends and receives between a user and the CLI backend 108. The generic CLI 106 is similar to a web browser sending user input to a server and rendering a response without knowing what the response represents.

Configuration

A configuration process may be required prior to operation of the generic CLI 106 on a client 102. The configuration process may include configuring a uniform resource locator (URL) endpoint of the CLI backend 108. The URL endpoint of the CLI backend 108 may be configured by a user of the client 102. The generic CLI 106 may also provide support to allow an account in which context CLI commands are to be executed to be configurable by the user. The generic CLI 106 may subsequently utilize the account information to avoid having the user provide this information with every platform service request. The account information may include a username and password provided by the user during the configuration of the account, and other information associated with the account and/or the user. Additional configuration information, for example, a URL authentication endpoint of the OAuth server 110 and command metadata may be retrieved from the cloud platform 104 by the generic CLI 106 and cached locally within the client 102, where the URL authentication endpoint of the OAuth server 110 may be provided by the OAuth server 110 and the command metadata may be provided from the metadata 112 by the CLI backend 108.

Authentication

The CLI 106 authenticates at the CLI backend 108 with an OAuth access token. The CLI 106 may utilize the URL endpoint of the CLI backend 108 configured during the configuration process to retrieve a URL authentication endpoint of the OAuth server 110. The CLI 106 may then utilize the URL authentication endpoint of the OAuth server 110 to provide the username and password provided by the user to the OAuth server 110 to retrieve an OAuth refresh token and store the OAuth refresh token locally within the client 102. The CLI 106 may utilize the OAuth refresh token to retrieve time limited OAuth access tokens for authenticating every command sent to the CLI backend 108. When the OAuth refresh token expires, the CLI 106 may prompt the user for re-login to allow a new OAuth refresh token to be obtained.

User Input Processing

The CLI backend 108 provides command metadata at metadata 112 associated with each command of a set of commands supported by the CLI backend 108. The command metadata associated with each command may include at least one of: 1) a uniform resource locator (URL) endpoint of a platform service; 2) an open authorization (OAuth) client to call the platform service; 3) a platform service API associated with the platform service; 4) a syntax definition of a command. In some implementations, the syntax definition may define at least one of: 1) which parameters are optional or mandatory; 2) if a particular parameter represents an option or a parameter; 3) if parameters are literals or reference a file or directory; 4) if environmental variable data associated with each of one or more environmental variables is to be included in addition to user-specified parameters; 5) mapping rules between user input and the platform service API; 6) mapping rules between response data from the platform service API and user output; or 7) command syntax and help text. The generic CLI 106 may retrieve the command metadata associated with each command from the CLI backend 108.

The generic CLI 106 may utilize the command metadata associated with a particular command to validate user input including the command provided by a user based on a syntax definition of the particular command in the command metadata. When the CLI 106 determines that the user input is valid, the CLI 106 may map the user input into a generic command request based on the syntax definition of the particular command. A generic command request may be in a generic format and may include at least one of: 1) an OAuth access token for authentication; 2) context information including account information and additional configuration data based on the command; 3) the command; or 4) command input data. The command input data may include at least one of: 1) environmental variable data associated with each of one or more environmental variables based on the metadata definition; 2) a literal parameter associated with each of one or more parameters in the user input that is a literal; 3) file data content associated with each of one or more files referenced in the user input; 4) file information including a file name associated with each of the one or more files referenced in the user input; 5) directory data content for each of one or more directories referenced in the user input; 6) directory information including a directory name associated with each of the one or more directories referenced in the user input; or 7) one or more command options.

To map the user input into the generic command request, the generic CLI 106 may determine how each parameter in the user input for the command is to be provided in the generic command request based on the syntax definition of the particular command. Based on the determination of how each parameter is to be provided, the generic CLI 106 may provide each parameter in the user input in the generic command request. When a parameter is determined to be a literal, the generic CLI 106 may provide the parameter in the generic command request as a literal. When a parameter is determined to be a reference to a file, the generic CLI 106 may read file data content of the file and provide the parameter in the generic command request as the file data content. The generic CLI 106 may also provide file information including a file name associated with the file in the generic command request. When a parameter is determined to be a reference to a directory, the generic CLI 106 may read directory data content of the directory and provide the parameter in the generic command request as the directory data content. The generic CLI 106 may also provide directory information including a directory name associated with the directory in the generic command request. The generic CLI 106 may also determine whether environmental variable data associated with each of one or more environmental variables is to be included in addition to user-specified parameters. When the generic CLI 106 determines that environmental variable data associated with each of one or more environmental variables is to be included in addition to user-specified parameters, the generic CLI 106 may get environmental variable data from the one or environmental variables and provide the environmental variable data in the generic command request. The generic CLI 106 may also provide an environmental variable name associated with each of the one or more environmental variables in the generic command request.

Backend Communication

After the user input has been successfully processed, the generic CLI 106 may also provide the OAuth access token for authentication, the context information including the account information, additional configuration data based on the command, and the command in the generic command response. The generic CLI 106 may then send the generic command request to the CLI backend 108.

The CLI backend 108 may receive the generic command request from the CLI 106 and may determine a platform service for the command in the generic command request based on the command metadata associated with the command of the set of commands supported by the CLI backend 108 at metadata 112. The CLI backend 108 may exchange the OAuth access token provided in the received data for a platform service specific token with the OAuth server 110. The CLI backend 108 may map command input data provided in the generic command request to a platform service API associated with the platform service based on the mapping rules between user input and the platform service API of the command metadata.

The CLI backend 108 may use the mapped platform service API to call the platform service. The call may be a REST call to the platform service at the platform services 114. The CLI backend 108 may evaluate response data from the call to the platform service and may map the response data to command output data in a generic command response based on mapping rules between response data from the platform service API and user output of the command metadata. A generic command response may be in a generic format and may include a response message for the platform service and command output data. In some implementations, the CLI backend 108 may include a success or an error message response in the response message of the generic command response based on whether the response data indicates that the call to the platform service was successful or ended with an error.

The command output data may include at least one of: 1) one or more sets of an environmental variable name and environmental variable data; 2) one or more sets of a file name and file data content; or 3) one or more sets of a directory name and directory data content. When the mapping rules of the command metadata indicate that the response data includes one or more sets of an environmental variable name and environmental variable data, the CLI backend 108 may map them from the response data and into the one or more sets of an environmental variable name and environmental variable data of the command output data. When the mapping rules of the command metadata indicate that the response data includes one or more sets of a file name and file data content, the CLI backend 108 may map them from the response data into one or more sets of a file name and file data content. When the mapping rules of the command metadata indicate that the response data includes one or more sets of a directory name and directory data content, the CLI backend 108 may map them from the response data into one or more sets of a directory name and directory data content of the command output data.

The generic format of the generic command response and the content of the command output data allows the CLI backend 108 to instruct the CLI 106 on how the command output data is to be processed. The CLI backend 108 may transmit the generic command response to the client 102.

User Output

The CLI 106 may receive the generic command response from the CLI backend 108. The CLI 106 may display the response message from the received generic command response to the user, for example, by writing the response message to a console of the client 102. The CLI 106 may also set and/or update environmental variables, create and/or update files, and create and/or update directories based on the received generic command response as instructed by the CLI backend 108 based on the generic format and the content of the command output data of the generic command response. The CLI 106 accomplishes this by processing the command output data. When the command output data includes one or more sets of an environmental variable name and environmental variable data, the CLI 106 sets/updates one or more environmental variables corresponding to the one or more environmental variable names with the corresponding environmental variable data. When the command output data includes one or more sets of a file name and file data content, the CLI 106 creates and/or updates one or more files corresponding to the one or more file names with the corresponding file content data. When the command output data includes one or more sets of a directory name and directory data content, the CLI 106 creates or updates one or more directories corresponding to the one or more directory names with the corresponding directory content data.

CLI Backend Features

The CLI backend 108 provides a gateway between the CLI 106 and the platform services 114 implementing the actual command functionality. The CLI backend 108 utilizes metadata 112 to provide generic mapping between user input and output and platform service APIs associated with the platform services 114. In one or more embodiments, the CLI backend 108 may also provide a server-side service provider plug-in interface (SPI) to perform more complex operations for a platform service that does not provide an API of the platform service that can be generically mapped to or that may require additional logic to be implemented outside of the platform service itself.

Authentication and Authorization

The CLI backend 108 may delegate the majority of the authentication process to the OAuth server 110 by providing the URL authentication endpoint of the OAuth server 110 to the CLI 106. This allows the CLI 106 to request OAuth access tokens that the CLI backend utilizes for validation of the CLI's 106 command request. The CLI backend 108 also checks whether the user is authorized to the CLI 106 for the requested account by exchanging the user provided OAuth access token for an account specific token and checking that the account specific token contains the CLI specific scope in this account.

Service Extensions

The CLI backend 108 provides the gateway to the actual platform services 114.

The CLI backend 108 does provide and deliver command help to the CLI 106 based on the provided metadata 112 that may include command syntax and help text. The CLI backend 108 does not provide any other platform service functionality by itself. The platform service commands are extensions that may each be registered at a command registry at the CLI backend 108 along with metadata associated with each platform service command. The metadata associated with each platform service command includes and defines: 1) a URL endpoint of the platform service; 2) an OAuth client to call the platform service; 3) an API of the platform service; 4) a syntax definition of a command; 5) mapping rules between user input and a request API of the platform service; 6) mapping rules between response data from the API of the platform service and user output; and 7) command syntax and help text. The associated with each platform service command may also include and define a plug-in for platform services that require customer logic.

Generic mapping between user input/output and platform service APIs

The CLI backend 108 may provide a generic mapping engine that compiles REST calls to the platform service from the user input provided by the CLI 106 and mapping rules or templates associated with the platform service. The generic mapping engine may also create user output in a generic command response from response data from the REST call response to return to the CLI 106 in the generic command response. The generic mapping engine may also instruct the CLI 106 how to handle files and directories and mapping to and from environment variables on the client 102. A server-side plug-in API may also be provided for platform services to perform more complex operations on the user input and user output.

Benefits of the generic CLI to an extensible list of cloud platform services

The generic CLI to an extensible list of cloud platform services, as previously described, may reduce development efforts to support new platform services as service providers may only need to provide metadata associated with the new platform services to the CLI backend to take advantage of the generic CLI on a client computing device, instead of implementing proprietary client applications for one or more client-side operating systems to support the new platform services. In addition, the generic CLI minimizes or eliminates the need for end users to manage frequent updates of an evolving CLI or to locate and install additional plug-ins that may be required by the evolving CLI. As previously described, the generic CLI can be extended with new functionality, an extensible list of cloud platform services, on the server-side in the cloud platform.

Figure 2:
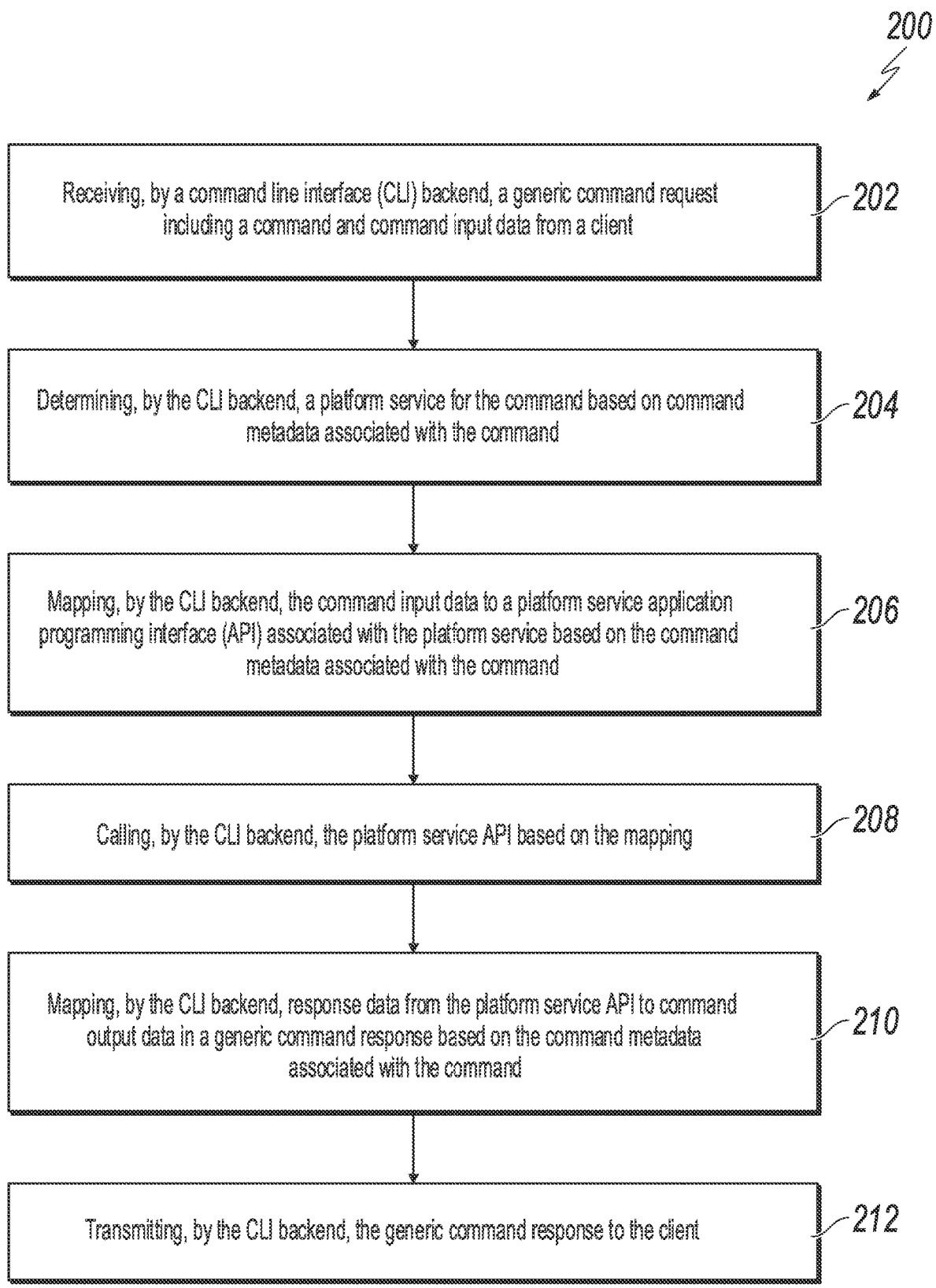
FIG. 2 is a flowchart illustrating an example of a computer-implemented method for providing a generic command line interface to an extensible list of cloud platform services, according to an implementation of the present disclosure.

FIG. 2 is a flowchart illustrating an example of a computer-implemented method 200 for providing a generic command line interface to an extensible list of cloud platform services, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 202, a generic command request including a command and command input data is received, by a command line interface (CLI) backend, from a client. From 202, method 200 proceeds to 204.

At 204, a platform service for the command is determined, by the CLI backend, based on command metadata associated with the command. In some implementations, the command metadata associated with the command includes at least one of: a uniform resource locator (URL) endpoint of a platform service; an open authorization (OAuth) client to call the platform service; a platform service API associated with the platform service; a syntax definition of a command; where the syntax definition defines at least one of: which parameters are optional or mandatory; if a particular parameter represents an option or a parameter; or if parameters are literals or reference a file or directory; mapping rules between user input and the platform service API; mapping rules between response data from the platform service API and user output; or command syntax and help text. From 204, method 200 proceeds to 206.

At 206, the command input data is mapped, by the CLI backend, to a platform service application programming interface (API) associated with the platform service based on the command metadata associated with the command. In some implementations, the command metadata associated with the command is retrieved, by a generic CLI on the client, from the CLI backend; user input including the command provided by a user is validated, by the generic CLI, based on a syntax definition of the command in the command metadata associated with the command; the user input is mapped, by the generic CLI, to the generic command request based on the syntax definition of the command; and the generic command request is transmitted, by the generic CLI, to the CLI backend. In some implementations, mapping the user input to the generic command request further comprises: how each parameter in the user input for the command is to be provided in the generic command request is determined, by the generic CLI on the client. In some implementations, based on the determination of how each parameter in the user input for the command is to be provided in the generic command request, each parameter in the user input in the generic command request is provided, by the generic CLI, where: when a parameter is determined to be a literal, the parameter in the generic command request is provided as a literal; when a parameter is determined to be a reference to a file: data content of the file is read; and the parameter in the generic command request is provided as the data content of the file; and when a parameter is determined to be a reference to a directory: data content of the directory is read; and the parameter in the generic command request is provided as the data content of the directory. From 206, method 200 proceeds to 208.

At 208, the platform service API is called, by the CLI backend, based on the mapping. From 208, method 200 proceeds to 210.

At 210, response data from the platform service API is mapped, by the CLI backend, to command output data in a generic command response based on the command metadata associated with the command. From 210, method 200 proceeds to 212.

At 212, the generic command response is transmitted, by the CLI backend, to the client. In some implementations, the generic command response is received, by a generic CLI on the client, from the CLI backend; a response message in the generic command response is displayed, by the generic CLI, to a user; and the command output data in the generic command response is processed, by the generic CLI on the client. In some implementations, processing the command output data further comprises: when the command output data includes one or more sets of an environmental variable name and environmental variable data, one or more environmental variables corresponding to one or more environmental variable names is updated with corresponding one or more environmental variable data; when the command output data includes one or more sets of a file name and file data content, one or more files corresponding to one or more file names is updated with corresponding file data content; and when the command output data includes one or more sets of a directory name and directory data content, one or more directories corresponding to one or more directory names is updated with corresponding directory content data. After 212, method 200 can stop.

Figure 3:
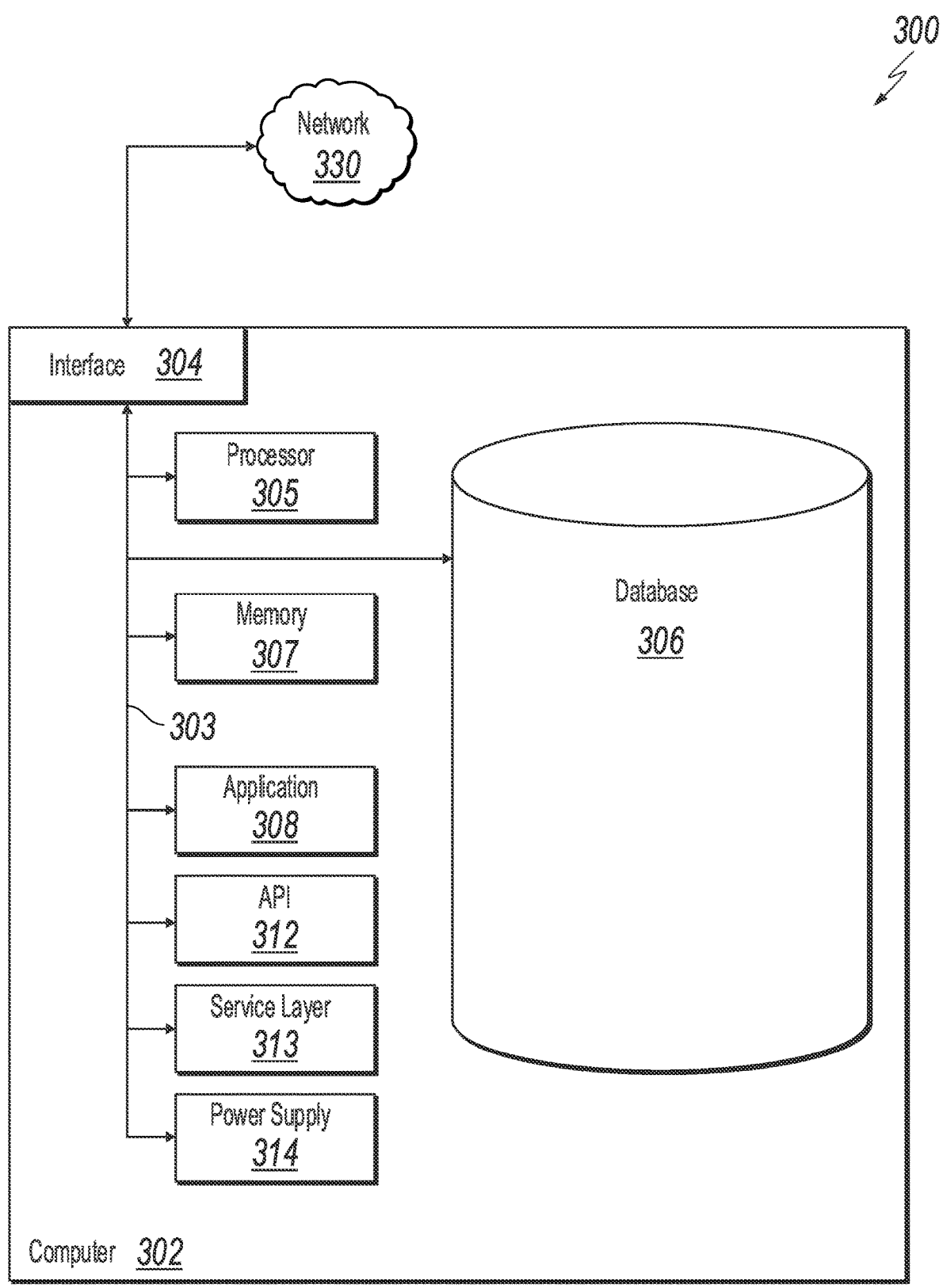
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330 (for example, network 101 from FIG. 1).

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, computer-implemented method, comprising: receiving, by a command line interface (CLI) backend, a generic command request including a command and command input data from a client; determining, by the CLI backend, a platform service for the command based on command metadata associated with the command; mapping, by the CLI backend, the command input data to a platform service application programming interface (API) associated with the platform service based on the command metadata associated with the command; calling, by the CLI backend, the platform service API based on the mapping; mapping, by the CLI backend, response data from the platform service API to command output data in a generic command response based on the command metadata associated with the command; and transmitting, by the CLI backend, the generic command response to the client.

The foregoing and other described implementations can each, optionally, include one or more of the following features:

A first feature, combinable with any of the following features, wherein the command metadata associated with the command includes at least one of: a uniform resource locator (URL) endpoint of a platform service; an open authorization (OAuth) client to call the platform service; a platform service API associated with the platform service; a syntax definition of a command, wherein the syntax definition defines at least one of: which parameters are optional or mandatory; if a particular parameter represents an option or a parameter; or if parameters are literals or reference a file or directory; mapping rules between user input and the platform service API; mapping rules between response data from the platform service API and user output; or command syntax and help text.

A second feature, combinable with any of the previous or following features, further comprising: retrieving, by a generic CLI on the client, the command metadata associated with the command from the CLI backend; validating, by the generic CLI, user input including the command provided by a user based on a syntax definition of the command in the command metadata associated with the command; mapping, by the generic CLI, the user input to the generic command request based on the syntax definition of the command; and transmitting, by the generic CLI, the generic command request to the CLI backend.

A third feature, combinable with any of the previous or following features, wherein mapping the user input to the generic command request further comprises: determining, by the generic CLI on the client, how each parameter in the user input for the command is to be provided in the generic command request.

A fourth feature, combinable with any of the previous or following features, further comprising: based on the determination of how each parameter in the user input for the command is to be provided in the generic command request, providing, by the generic CLI, each parameter in the user input in the generic command request, wherein: when a parameter is determined to be a literal, providing the parameter in the generic command request as a literal; when a parameter is determined to be a reference to a file: reading data content of the file; and providing the parameter in the generic command request as the data content of the file; and when a parameter is determined to be a reference to a directory: reading data content of the directory; and providing the parameter in the generic command request as the data content of the directory.

A fifth feature, combinable with any of the previous or following features, further comprising: receiving, by a generic CLI on the client, the generic command response from the CLI backend; displaying, by the generic CLI, a response message in the generic command response to a user; and processing, by the generic CLI on the client, the command output data in the generic command response.

A sixth feature, combinable with any of the previous or following features, wherein processing the command output data further comprises: when the command output data includes one or more sets of an environmental variable name and environmental variable data, updating one or more environmental variables corresponding to one or more environmental variable names with corresponding one or more environmental variable data; when the command output data includes one or more sets of a file name and file data content, updating one or more files corresponding to one or more file names with corresponding file data content; and when the command output data includes one or more sets of a directory name and directory data content, updating one or more directories corresponding to one or more directory names with corresponding directory content data.

In a second implementation, a non-transitory, computer-readable medium storing one or more instructions executable by a computer system to perform operations comprising: receiving, by a command line interface (CLI) backend, a generic command request including a command and command input data from a client; determining, by the CLI backend, a platform service for the command based on command metadata associated with the command; mapping, by the CLI backend, the command input data to a platform service application programming interface (API) associated with the platform service based on the command metadata associated with the command; calling, by the CLI backend, the platform service API based on the mapping; mapping, by the CLI backend, response data from the platform service API to command output data in a generic command response based on the command metadata associated with the command; and transmitting, by the CLI backend, the generic command response to the client.

The foregoing and other described implementations can each, optionally, include one or more of the following features:

A first feature, combinable with any of the following features, wherein the command metadata associated with the command includes at least one of: a uniform resource locator (URL) endpoint of a platform service; an open authorization (OAuth) client to call the platform service; a platform service API associated with the platform service; a syntax definition of a command, wherein the syntax definition defines at least one of: which parameters are optional or mandatory; if a particular parameter represents an option or a parameter; or if parameters are literals or reference a file or directory; mapping rules between user input and the platform service API; mapping rules between response data from the platform service API and user output; or command syntax and help text.

A second feature, combinable with any of the previous or following features, further comprising: retrieving, by a generic CLI on the client, the command metadata associated with the command from the CLI backend; validating, by the generic CLI, user input including the command provided by a user based on a syntax definition of the command in the command metadata associated with the command; mapping, by the generic CLI, the user input to the generic command request based on the syntax definition of the command; and transmitting, by the generic CLI, the generic command request to the CLI backend.

A third feature, combinable with any of the previous or following features, wherein mapping the user input to the generic command request further comprises: determining, by the generic CLI on the client, how each parameter in the user input for the command is to be provided in the generic command request.

A fourth feature, combinable with any of the previous or following features, further comprising: based on the determination of how each parameter in the user input for the command is to be provided in the generic command request, providing, by the generic CLI, each parameter in the user input in the generic command request, wherein: when a parameter is determined to be a literal, providing the parameter in the generic command request as a literal; when a parameter is determined to be a reference to a file: reading data content of the file; and providing the parameter in the generic command request as the data content of the file; and when a parameter is determined to be a reference to a directory: reading data content of the directory; and providing the parameter in the generic command request as the data content of the directory.

A fifth feature, combinable with any of the previous or following features, further comprising: receiving, by a generic CLI on the client, the generic command response from the CLI backend; displaying, by the generic CLI, a response message in the generic command response to a user; and processing, by the generic CLI on the client, the command output data in the generic command response.

A sixth feature, combinable with any of the previous or following features, wherein processing the command output data further comprises: when the command output data includes one or more sets of an environmental variable name and environmental variable data, updating one or more environmental variables corresponding to one or more environmental variable names with corresponding one or more environmental variable data; when the command output data includes one or more sets of a file name and file data content, updating one or more files corresponding to one or more file names with corresponding file data content; and when the command output data includes one or more sets of a directory name and directory data content, updating one or more directories corresponding to one or more directory names with corresponding directory content data.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, by a command line interface (CLI) backend, a generic command request including a command and command input data from a client; determining, by the CLI backend, a platform service for the command based on command metadata associated with the command; mapping, by the CLI backend, the command input data to a platform service application programming interface (API) associated with the platform service based on the command metadata associated with the command; calling, by the CLI backend, the platform service API based on the mapping; mapping, by the CLI backend, response data from the platform service API to command output data in a generic command response based on the command metadata associated with the command; and transmitting, by the CLI backend, the generic command response to the client.

The foregoing and other described implementations can each, optionally, include one or more of the following features:

A first feature, combinable with any of the following features, wherein the command metadata associated with the command includes at least one of: a uniform resource locator (URL) endpoint of a platform service; an open authorization (OAuth) client to call the platform service; a platform service API associated with the platform service; a syntax definition of a command, wherein the syntax definition defines at least one of: which parameters are optional or mandatory; if a particular parameter represents an option or a parameter; or if parameters are literals or reference a file or directory; mapping rules between user input and the platform service API; mapping rules between response data from the platform service API and user output; or command syntax and help text.

A second feature, combinable with any of the previous or following features, further comprising: retrieving, by a generic CLI on the client, the command metadata associated with the command from the CLI backend; validating, by the generic CLI, user input including the command provided by a user based on a syntax definition of the command in the command metadata associated with the command; mapping, by the generic CLI, the user input to the generic command request based on the syntax definition of the command; and transmitting, by the generic CLI, the generic command request to the CLI backend.

A third feature, combinable with any of the previous or following features, wherein mapping the user input to the generic command request further comprises: determining, by the generic CLI on the client, how each parameter in the user input for the command is to be provided in the generic command request.

A fourth feature, combinable with any of the previous or following features, further comprising: based on the determination of how each parameter in the user input for the command is to be provided in the generic command request, providing, by the generic CLI, each parameter in the user input in the generic command request, wherein: when a parameter is determined to be a literal, providing the parameter in the generic command request as a literal; when a parameter is determined to be a reference to a file: reading data content of the file; and providing the parameter in the generic command request as the data content of the file; and when a parameter is determined to be a reference to a directory: reading data content of the directory; and providing the parameter in the generic command request as the data content of the directory.

A fifth feature, combinable with any of the previous or following features, further comprising: receiving, by a generic CLI on the client, the generic command response from the CLI backend; displaying, by the generic CLI, a response message in the generic command response to a user; and processing, by the generic CLI on the client, the command output data in the generic command response.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLUE-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, by a command line interface (CLI) backend, a generic command request comprising a command and command input data from a client;
   determining, by the CLI backend, a platform service for the command based on command metadata associated with the command, wherein the command metadata associated with the command comprises a syntax definition of a command, wherein the syntax definition defines mapping of the command to the platform service using mapping rules between user input and a platform service application programming interface (API) associated with the platform service, the mapping rules indicating a name and a content of command output data;
   mapping, by the CLI backend, the command input data to the platform service API based on the command metadata associated with the command;
   calling, by the CLI backend, the platform service API based on the mapping;
   mapping, by the CLI backend, response data from the platform service API to the command output data in a generic command response based on the command metadata associated with the command; and
   transmitting, by the CLI backend, the generic command response to the client.

2. The computer-implemented method of claim 1, wherein the command metadata associated with the command further comprises at least one of:
   a uniform resource locator (URL) endpoint of a platform service;
   an open authorization (OAuth) client to call the platform service; or
   a platform service API associated with the platform service, and wherein the syntax definition further defines at least one of:
   which parameters are optional or mandatory;
   if a particular parameter represents an option or a parameter;
   if parameters are literals or reference a file or directory;
   mapping rules between response data from the platform service API and user output; or
   command syntax and help text.

3. The computer-implemented method of claim 1, further comprising:
   retrieving, by a generic CLI on the client, the command metadata associated with the command from the CLI backend;
   validating, by the generic CLI, user input comprising the command provided by a user based on a syntax definition of the command in the command metadata associated with the command;
   mapping, by the generic CLI, the user input to the generic command request based on the syntax definition of the command; and
   transmitting, by the generic CLI, the generic command request to the CLI backend.

4. The computer-implemented method of claim 3, wherein mapping the user input to the generic command request further comprises:
   determining, by the generic CLI on the client, how each parameter in the user input for the command is to be provided in the generic command request.

5. The computer-implemented method of claim 4, further comprising:
   based on the determination of how each parameter in the user input for the command is to be provided in the generic command request, providing, by the generic CLI, each parameter in the user input in the generic command request, wherein:
   when a parameter is determined to be a literal, providing the parameter in the generic command request as a literal;
   when a parameter is determined to be a reference to a file:
      reading data content of the file; and
      providing the parameter in the generic command request as the data content of the file; and
   when a parameter is determined to be a reference to a directory:
   reading data content of the directory; and
   providing the parameter in the generic command request as the data content of the directory.

6. The computer-implemented method of claim 1, further comprising:
   receiving, by a generic CLI on the client, the generic command response from the CLI backend;
   displaying, by the generic CLI, a response message in the generic command response to a user; and
   processing, by the generic CLI on the client, the command output data in the generic command response.

7. The computer-implemented method of claim 6, wherein processing the command output data further comprises:
   when the command output data comprises one or more sets of an environmental variable name and environmental variable data, updating one or more environmental variables corresponding to one or more environmental variable names with corresponding one or more environmental variable data;
   when the command output data comprises one or more sets of a file name and file data content, updating one or more files corresponding to one or more file names with corresponding file data content; and
   when the command output data comprises one or more sets of a directory name and directory data content, updating one or more directories corresponding to one or more directory names with corresponding directory content data.

8. A non-transitory, computer-readable medium storing one or more instructions executable by a computer system to perform operations comprising:
  receiving, by a command line interface (CLI) backend, a generic command request comprising a command and command input data from a client;
  determining, by the CLI backend, a platform service for the command based on command metadata associated with the command, wherein the command metadata associated with the command comprises a syntax definition of a command, wherein the syntax definition defines mapping of the command to the platform service using mapping rules between user input and a platform service application programming interface (API) associated with the platform service, the mapping rules indicating a name and a content of command output data;
  mapping, by the CLI backend, the command input data to the platform service API based on the command metadata associated with the command;
  calling, by the CLI backend, the platform service API based on the mapping;
  mapping, by the CLI backend, response data from the platform service API to the command output data in a generic command response based on the command metadata associated with the command; and
  transmitting, by the CLI backend, the generic command response to the client.

9. The non-transitory, computer-readable medium of claim 8, wherein the command metadata associated with the command further comprises at least one of:
  a uniform resource locator (URL) endpoint of a platform service;
  an open authorization (OAuth) client to call the platform service; or
  a platform service API associated with the platform service, and wherein the syntax definition further defines at least one of:
  which parameters are optional or mandatory;
  if a particular parameter represents an option or a parameter;
  if parameters are literals or reference a file or directory;
  mapping rules between response data from the platform service API and user output; or
  command syntax and help text.

10. The non-transitory, computer-readable medium of claim 8, further comprising:
  retrieving, by a generic CLI on the client, the command metadata associated with the command from the CLI backend;
  validating, by the generic CLI, user input comprising the command provided by a user based on a syntax definition of the command in the command metadata associated with the command;
  mapping, by the generic CLI, the user input to the generic command request based on the syntax definition of the command; and
  transmitting, by the generic CLI, the generic command request to the CLI backend.

11. The non-transitory, computer-readable medium of claim 10, wherein mapping the user input to the generic command request further comprises:
  determining, by the generic CLI on the client, how each parameter in the user input for the command is to be provided in the generic command request.

12. The non-transitory, computer-readable medium of claim 11, further comprising:
  based on the determination of how each parameter in the user input for the command is to be provided in the generic command request, providing, by the generic CLI, each parameter in the user input in the generic command request, wherein:
  when a parameter is determined to be a literal, providing the parameter in the generic command request as a literal;
  when a parameter is determined to be a reference to a file:
    reading data content of the file; and
    providing the parameter in the generic command request as the data content of the file; and
  when a parameter is determined to be a reference to a directory:
  reading data content of the directory; and
    providing the parameter in the generic command request as the data content of the directory.

13. The non-transitory, computer-readable medium of claim 8, further comprising:
  receiving, by a generic CLI on the client, the generic command response from the CLI backend;
  displaying, by the generic CLI, a response message in the generic command response to a user; and
  processing, by the generic CLI on the client, the command output data in the generic command response.

14. The non-transitory, computer-readable medium of claim 13, wherein processing the command output data further comprises:
  when the command output data comprises one or more sets of an environmental variable name and environmental variable data, updating one or more environmental variables corresponding to one or more environmental variable names with corresponding one or more environmental variable data;
  when the command output data comprises one or more sets of a file name and file data content, updating one or more files corresponding to one or more file names with corresponding file data content; and
  when the command output data comprises one or more sets of a directory name and directory data content, updating one or more directories corresponding to one or more directory names with corresponding directory content data.

15. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    receiving, by a command line interface (CLI) backend, a generic command request comprising a command and command input data from a client;
    determining, by the CLI backend, a platform service for the command based on command metadata associated with the command, wherein the command metadata associated with the command comprises a syntax definition of a command, wherein the syntax definition defines mapping of the command to the platform service using mapping rules between user input and a platform service application programming interface (API) associated with the platform service, the mapping rules indicating a name and a content of command output data;

mapping, by the CLI backend, the command input data to the platform service API based on the command metadata associated with the command;

calling, by the CLI backend, the platform service API based on the mapping;

mapping, by the CLI backend, response data from the platform service API to the command output data in a generic command response based on the command metadata associated with the command; and transmitting, by the CLI backend, the generic command response to the client.

16. The computer-implemented system of claim 15, wherein the command metadata associated with the command further comprises at least one of:

a uniform resource locator (URL) endpoint of a platform service;

an open authorization (OAuth) client to call the platform service; or a platform service API associated with the platform service, and wherein the syntax definition further defines at least one of:

which parameters are optional or mandatory;

if a particular parameter represents an option or a parameter;

if parameters are literals or reference a file or directory;

mapping rules between response data from the platform service API and user output; or command syntax and help text.

17. The computer-implemented system of claim 15, further comprising:

retrieving, by a generic CLI on the client, the command metadata associated with the command from the CLI backend;

validating, by the generic CLI, user input comprising the command provided by a user based on a syntax definition of the command in the command metadata associated with the command;

mapping, by the generic CLI, the user input to the generic command request based on the syntax definition of the command; and transmitting, by the generic CLI, the generic command request to the CLI backend.

18. The computer-implemented system of claim 17, wherein mapping the user input to the generic command request further comprises:

determining, by the generic CLI on the client, how each parameter in the user input for the command is to be provided in the generic command request.

19. The computer-implemented system of claim 18, further comprising:

based on the determination of how each parameter in the user input for the command is to be provided in the generic command request, providing, by the generic CLI, each parameter in the user input in the generic command request, wherein:

when a parameter is determined to be a literal, providing the parameter in the generic command request as a literal;

when a parameter is determined to be a reference to a file:

reading data content of the file; and providing the parameter in the generic command request as the data content of the file; and when a parameter is determined to be a reference to a directory:

reading data content of the directory; and providing the parameter in the generic command request as the data content of the directory.

20. The computer-implemented system of claim 15, further comprising:

receiving, by a generic CLI on the client, the generic command response from the CLI backend;

displaying, by the generic CLI, a response message in the generic command response to a user; and processing, by the generic CLI on the client, the command output data in the generic command response.

* * * * *